(12) United States Patent
Giobbio et al.

(10) Patent No.: US 6,702,475 B1
(45) Date of Patent: Mar. 9, 2004

(54) RELEASE SYSTEM FOR OPTICAL CONNECTORS

(75) Inventors: Giovanni Giobbio, Rovellasca (IT); Giuliano Antonini, Desio (IT)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 10/140,476

(22) Filed: May 7, 2002

(51) Int. Cl.[7] .................................................. G02B 6/36
(52) U.S. Cl. .......................................... 385/53; 439/352
(58) Field of Search .......................... 385/53, 136, 137, 385/138, 139; 439/352

(56) References Cited

U.S. PATENT DOCUMENTS

| | | | |
|---|---|---|---|
| 5,745,621 A | 4/1998 | Musk | 385/72 |
| 5,809,192 A | 9/1998 | Manning et al. | 385/78 |
| 6,196,733 B1 * | 3/2001 | Wild | 385/86 |
| 6,203,355 B1 * | 3/2001 | Neblett et al. | 439/372 |
| 6,254,418 B1 * | 7/2001 | Tharp et al. | 439/352 |
| 6,287,018 B1 * | 9/2001 | Andrews et al. | 385/60 |
| 6,318,905 B1 | 11/2001 | Valencia et al. | 385/78 |
| 6,543,941 B1 * | 4/2003 | Lampert | 385/58 |
| 6,550,979 B1 * | 4/2003 | Fleenor et al. | 385/78 |

* cited by examiner

Primary Examiner—Lynn Feild
Assistant Examiner—Phuong KT Dinh
(74) Attorney, Agent, or Firm—Ritter, Lang & Kaplan LLP

(57) ABSTRACT

A system for releasing an optical connector adapter from an optical connector is disclosed. The adapter has a longitudinal opening extending therethrough and is configured for joining two optical connectors positioned within the opening. The connector has a locking member configured for locking engagement with the adapter. The system includes a block configured for connection to an equipment panel. The block has an opening extending therethrough and is sized for receiving the optical connector adapter and an internal optical connector having an optical line extending into an interior side of the panel. The system further includes a release mechanism movably mounted within the block between a closed position in which the internal optical connector is in locking engagement with the adapter and an open position in which the adapter is released from locking engagement with the internal optical connector.

13 Claims, 13 Drawing Sheets

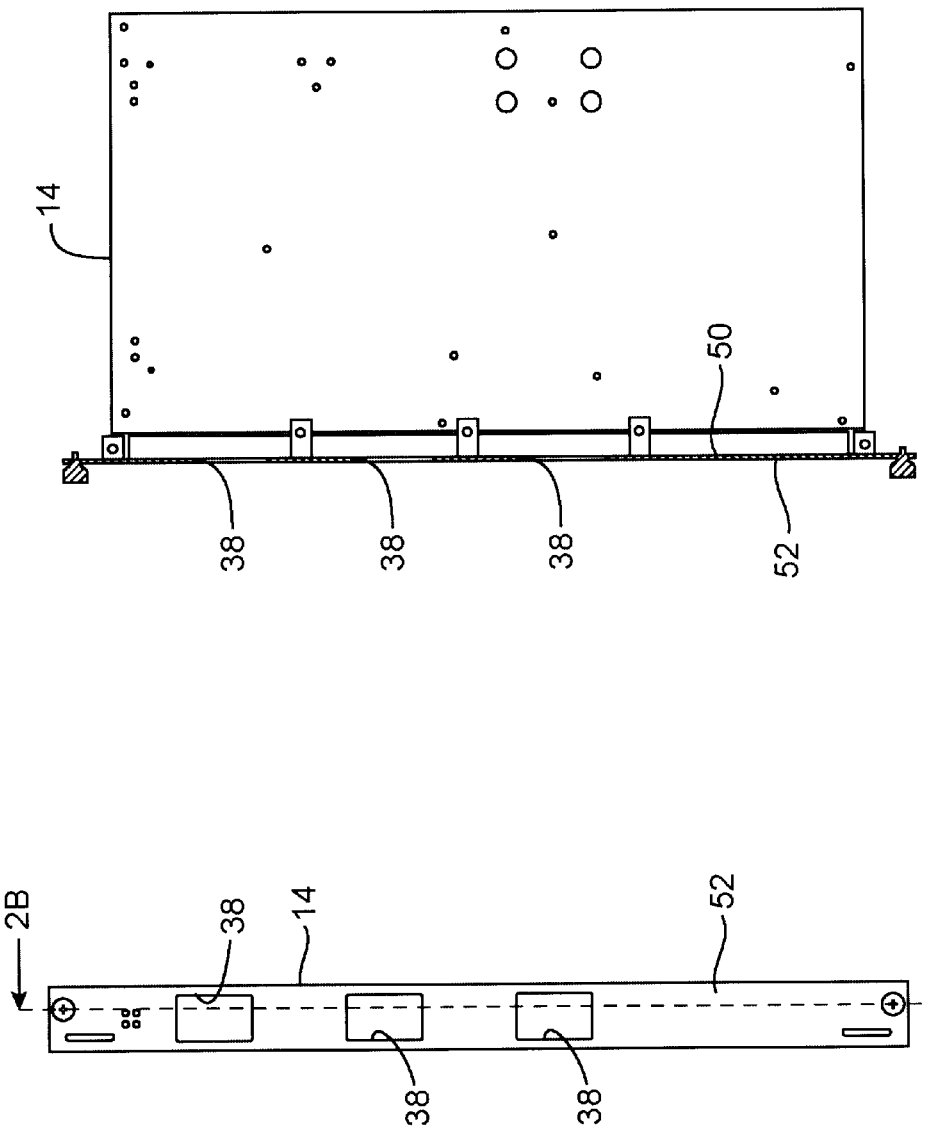

US 6,702,475 B1

RELEASE SYSTEM FOR OPTICAL CONNECTORS

BACKGROUND OF THE INVENTION

The present invention relates generally to fiber optic systems, and more specifically, to an optical connector release system.

Optical communication systems provide many advantages over conventional communication systems. For example, optical communication systems provide wide bandwidth and low attenuation and are designed to transmit signals over long distances. Optical connectors are used in optical systems to interconnect and disconnect optical fibers used for light transmission. The optical connectors join and align cores of two fibers at high accuracy so that light is transmitted from one into the other with minimum loss.

Standard optical connectors include, for example, SC, FC, LC, MU, E2000, and F3000, which are made by a number of different manufacturers. The connectors are positioned on the ends of an optical fiber, with the fiber tip being polished to provide a desired interconnecting surface. Most optical connectors utilize a precision ceramic cylindrical ferrule which has a drilled hole into which the fiber is inserted and epoxied. The ferrule is a tubular sheath which holds the end portion of an optical fiber and provides precise positioning of the fiber. The ferrule is normally mounted within a sleeve which has at the opposite end a part affixed thereto, referred to as a boot, which supports the outer cladding of the fiber as it enters the connector.

To make a connection between two fibers, two optical connectors are required, together with an adapter which is used to align the optical connectors so that the fibers are properly aligned and light is transmitted from one fiber to the other fiber. An adapter typically includes an alignment sleeve which is used to align the ferrules of the two optical connectors. A mechanism is typically provided to secure the adapter to the optical connector. The mechanism may be a screw thread arrangement, bayonet arrangement, or a push/pull arrangement where an outer sleeve is held and moved into an open end of the adapter.

Typically, the connection between connectors coming internal from the unit with the connectors coming external from the unit needs an adapter. The adapter is normally assembled on the front panel of the units, which is the most common way to put in contact internal and external signals. However, this system has a drawback in that there is not easy access to the internal connector from the external side. An alternative solution to provide quick access to the internal side is to directly fix the internal connector on the unit front panel and to leave the adapter free. This type of connection problem can be resolved with the use of a fiber block.

A fitting commonly referred to as a fiber block is typically inserted into an opening in an equipment panel and sized to receive the adapter and hold the connector assembly in place. One of the optical connectors is inserted into the fiber block from a location external to the optical unit and the mating connector is inserted into the other end of the fiber block from a location internal to the optical unit. Access to the fiber optics mounted within the fiber block is required since fiber optics and connections therebetween are inspected and cleaned at periodic intervals to prevent signal losses or an interruption in the transmission of data due to flaws on the end surface of the fiber optics. In order to inspect the end surface of a fiber optic, the connector and adapter must be removed so that it can be determined if there are any imperfections, such as cracks, scratches, chips or dirt, on the end surface of the fiber optic.

Conventional optical connector adapters are typically classified as either standard mounting (e.g., screws) or quick mounting (e.g., snap, spring). Both systems include a feature to provide a secure connection between adapters and fiber block or front panel directly.

One drawback with these adapters is that a tool is required to remove the adapter and removal is often time consuming. It is also often difficult to disassemble the adapter due to the locking feature being located at the internal side of the front panel.

These systems include two connecting mechanisms between optical connectors and adapters. Both systems utilize a quick insertion-extraction mechanism; one is typically released by either an adapter push pull mechanism (SC-MU-MPO connectors), another by pushing a latch, which is located on the connector (E2000-F3000-LC connectors). The second type of connection system for the adapter release requires access to the connector, which is often difficult when the connector is located internal to fiber optic equipment.

There is, therefore, a need for an optical connector release system that provides for quick access to fiber optics of an internal optical connector while providing a secure connection between the fiber optic connectors.

SUMMARY OF THE INVENTION

A system for releasing an optical connector adapter from an optical connector is disclosed. The adapter has a longitudinal opening extending therethrough and is configured for joining two optical connectors positioned within the opening. The connector has a locking member configured for locking engagement with the adapter. The system generally includes a block configured for connection to an equipment panel. The block has an opening extending therethrough and is sized for receiving the optical connector adapter and an internal optical connector having an optical line extending into an interior side of the panel. The system further includes a release mechanism movably mounted within the block between a closed position in which the internal optical connector is in locking engagement with the adapter and an open position in which the adapter is released from locking engagement with the internal optical connector.

The above is a brief description of some deficiencies in the prior art and advantages of the present invention. Other features, advantages, and embodiments of the invention will be apparent to those skilled in the art from the following description, drawings, and claims.

BRIEF DESCRIPTION OF THE DRAWINGS

FIG. 2A is a front view of the panel having openings for insertion of the release system of FIG. 1A.

FIG. 2B is a cross-sectional view taken through line 2B—2B of FIG. 2A.

Corresponding reference characters indicate corresponding parts throughout the several views of the drawings.

DETAILED DESCRIPTION OF THE INVENTION

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

Figure 1A:
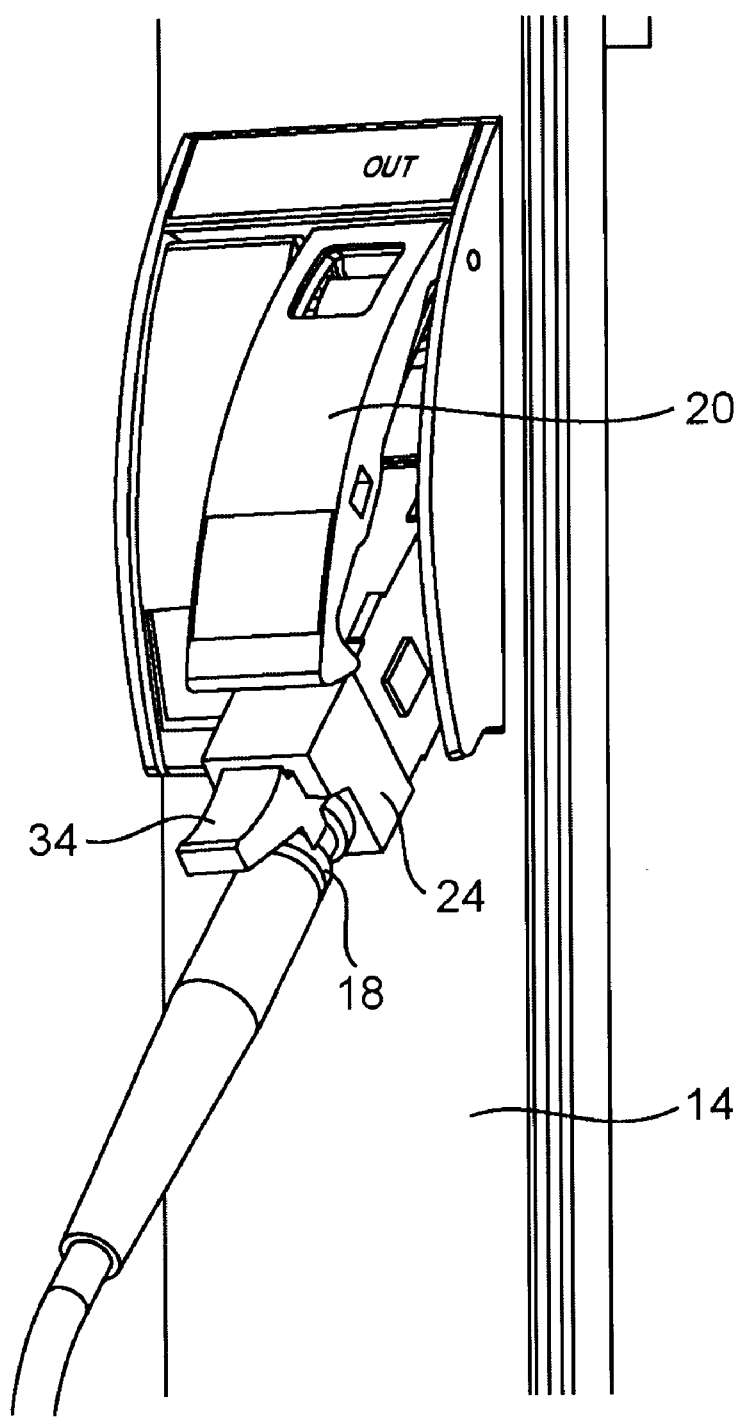
FIG. 1 A is a perspective of an optical connector release system of the present invention installed in an equipment panel.
FIG. 1B is a cross-section of the optical connector adapter release system of FIG. 1A.
Figure 1B:
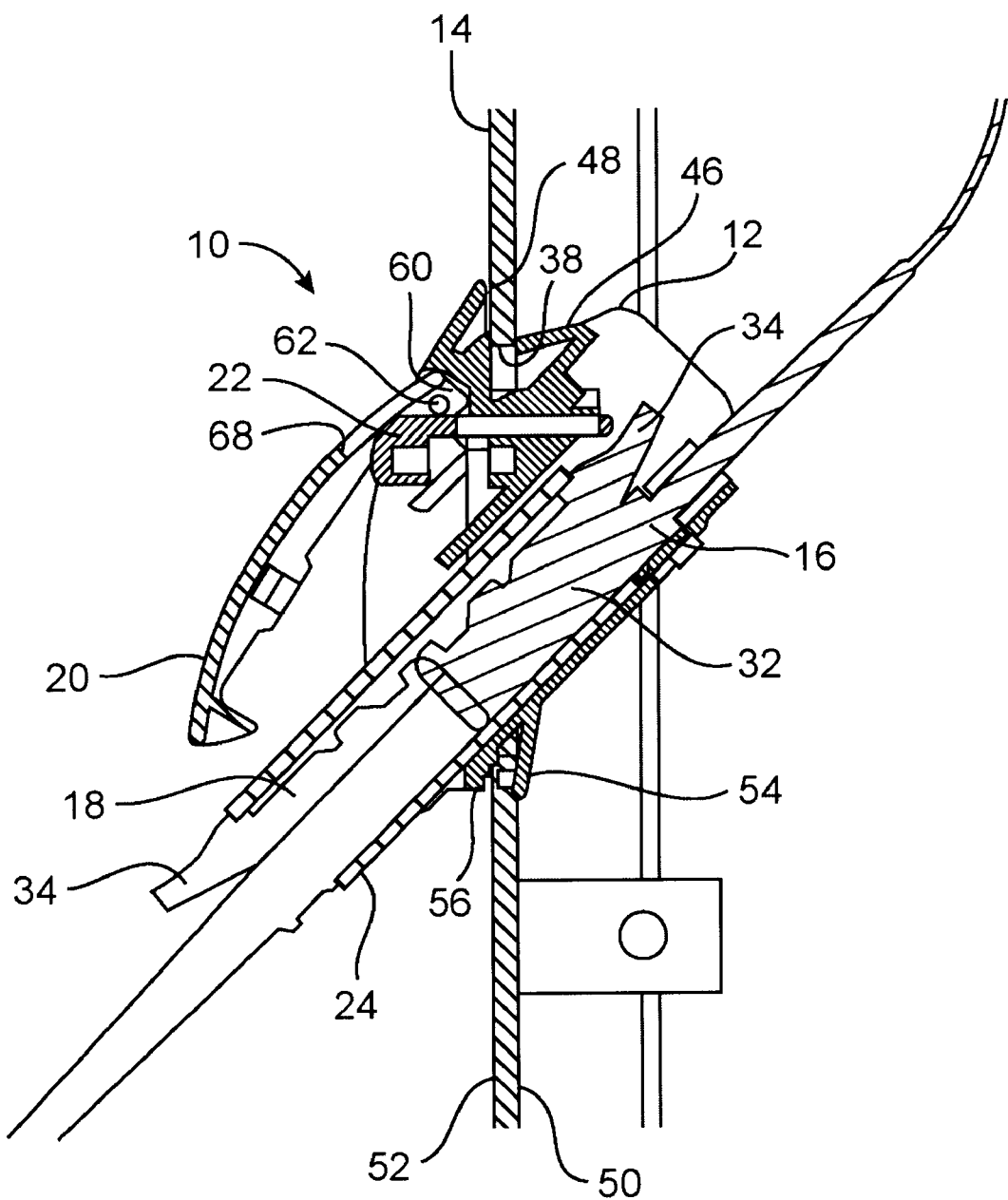

Referring now to the drawings, and first to FIGS. 1A and 1B, an optical connector release system is shown and generally indicated at 10. The system comprises a main body (fiber block) 12 configured for attachment to a panel 14, such as an aluminum panel of an optical network system unit. An optical connector 16 is mounted on the fiber block internal to the unit and connected to an optical connector 18 positioned in the fiber block 12 from an external location on the unit. The fiber block 12 thus forms the internal/external optical unit interface. The fiber block 12 includes a door 20 and a latching mechanism 22 operable to securely hold the two mating optical connectors 16, 18 and an adapter 24 which aligns the two mating connectors in place when in its closed position and release the external connector and adapter when in its open position. The release system 10 of the present invention allows for removal of the adapter 24 without access to the connector 16 located internal to the unit or the need for special tools. The system further provides a secure locking system when in its closed position. The system may be used in communication systems or any other systems which utilize optical connectors. For example, the system may be used within components for an ONS 15808 Long-Haul and Extended Long Haul DWDM (Dense Wavelength Division Multiplexing) system, available from Cisco Systems, Inc. of San Jose, Calif.

The connectors 16, 18 and adapter 24 may be any standard connector or adapter such as LC, E2000, or F3000, for example. FIG. 1A shows two E2000 connectors and an E2000 adapter. The connectors 16, 18 include a housing 32 and a ferrule (not shown) with an optical fiber secured therein. The tip end face of the ferrule is flat or angled to enable optical connection with another ferrule. The ferrule is typically formed from a ceramic material. The housing 32 is shaped to fit within the optical connector adapter 24. The connector 16, 18 may include an integrated protective cap to protect the ferrule from dust. The protective cap is spring loaded and opened upon engagement with the adapter 24. In this application the adapter 24 does not include mounting flanges. The connector 16, 18 is attached to the adapter 24 by a depressible latch 34 (locking member) on the connector. It is to be understood that the type of connector, adapter, and locking member shown and described herein is only one example and that different types of connectors, adapters, or locking members may be used without departing from the scope of the invention.

The fiber block 12 is sized for insertion into an opening 38 in panel 14, as shown in FIGS. 2A and 2B. The panel 14 may be, for example, an aluminum panel of a network device of an optical system or other optical equipment. Referring again to FIGS. 1A and 1B, the fiber block includes a body sized for insertion into the panel opening 38, a door 20 pivotably mounted on the body, and a latching mechanism 22, described in detail below. The body is tubular and includes two locking devices used to securely attach the fiber block to the panel 14 and prevent movement of the fiber block relative to the panel. The first locking device is positioned at an upper end of the body (as viewed in FIG. 1B) and includes a finger 46 extending from an end portion of the body and a reference plane 48 extending rearward towards the finger. The finger 46 is positioned to contact an interior surface 50 of the panel and the reference plane 48 is positioned to contact an exterior surface 52 of the panel. The finger 46 and reference plane 48 form a pressure fit with the panel 14 interposed therebetween. The second locking device is located at a lower end of the of the body (as viewed in FIG. 1B) and includes a finger 54 and a reference plane 56 (in the present embodiment reference plane 56 is the same plane of 48) both located at a forward portion of the body. The finger 54 is positioned to contact the interior side 50 of the panel 14 and the reference plane 56 is positioned to contact the exterior side 52 of the panel to form a pressure fit with the panel thereby securely holding the fiber block 12 in place. It is to be understood that the locking devices shown and described herein are only examples and the fiber block 12 may be held in place within the panel 14 by other means without departing from the scope of the invention.

The tubular portion of the body is sized for receiving optical adapter 24 and optical connectors 16, 18. The body may be generally rectangular in longitudinal cross-section for use with an E2000 adapter, for example.

Figure 9:
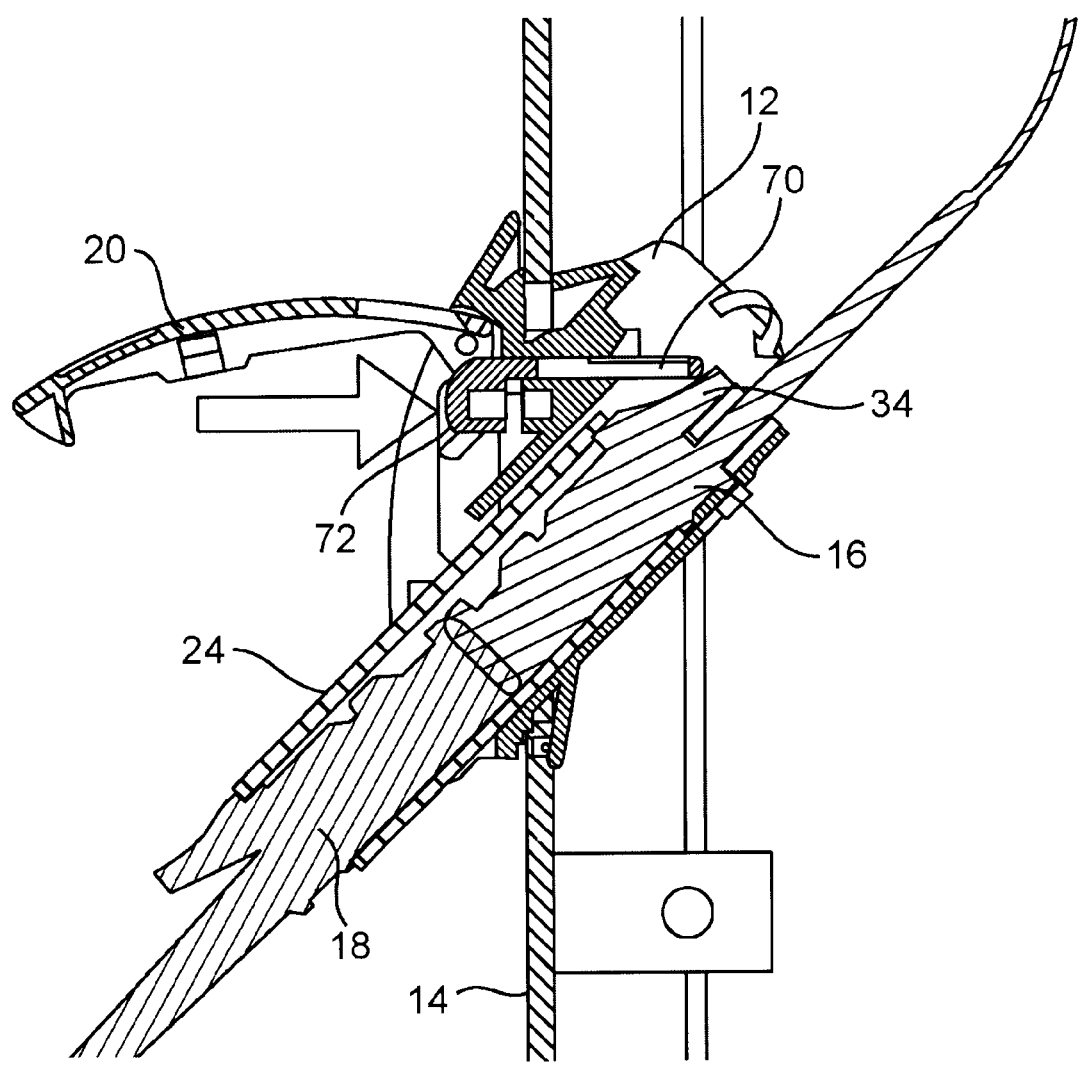
FIG. 9 is a cross-sectional view of the system of FIG. 8 with the release button depressed to release the connector adapter.

The door 20 is pivotably mounted on the body of the fiber block 12 for movement between a closed position (FIG. 3) and an open position (FIG. 9). The door 20 rests in an intermediate position when the adapter and connectors are positioned within the fiber block 12 (FIG. 1B). The door 20 includes two flanges 60 each having an opening for receiving a pin 62 that extends through the flanges 20 and two aligned openings located on opposite sides of the fiber block body. The fiber block 12 also includes a spring (not shown) arranged so that the door 20 is spring loaded to its closed position. The door 20 includes an opening 68 for receiving a release button of the release mechanism 22. It is to be understood that the door may be removed from the system without departing from the scope of the invention.

Figure 4:
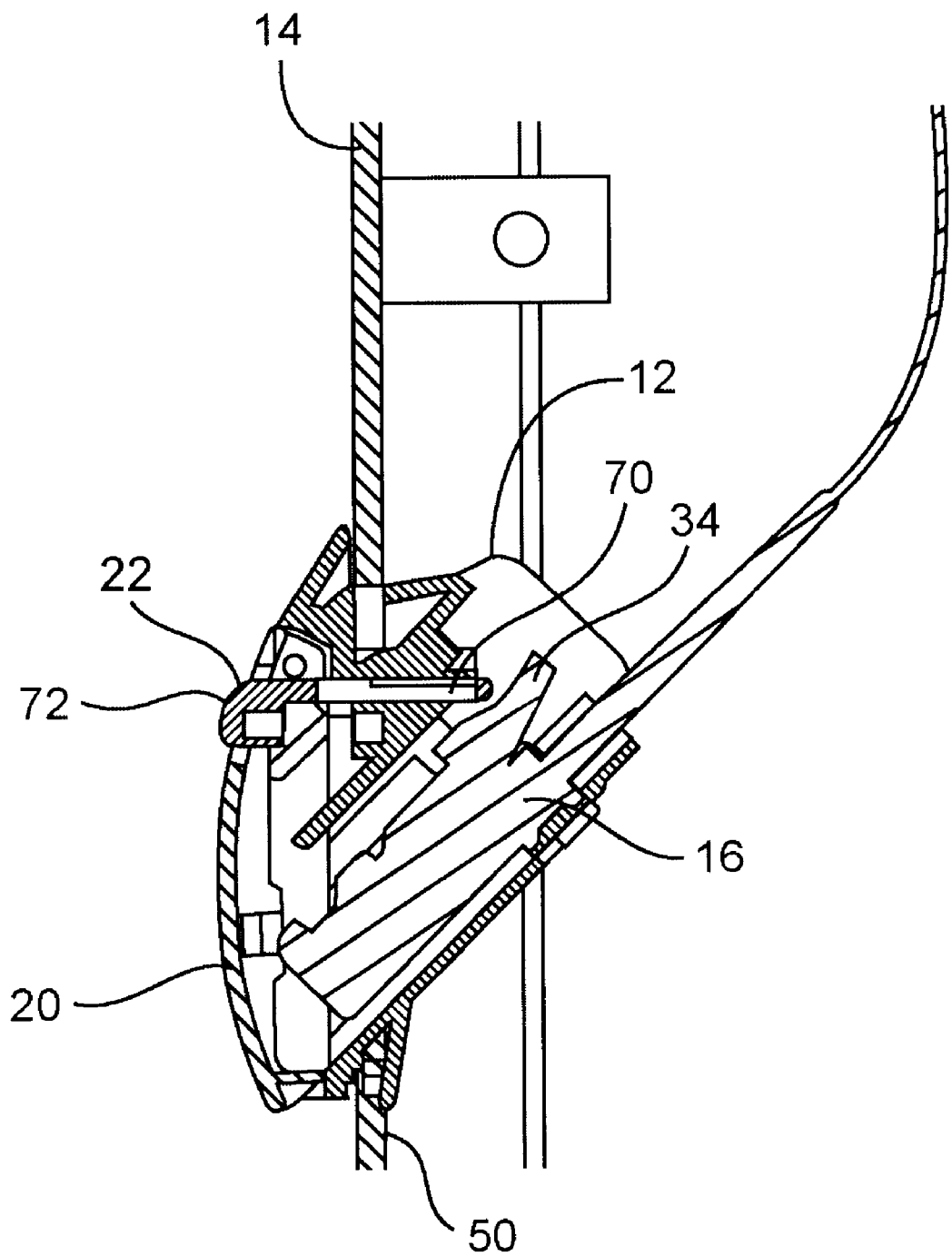
FIG. 4 is a cross-sectional view of the system of FIG. 3 with the internal optical connector inserted and locked into the release system.

The release mechanism 22 includes a rod 70 slidably mounted within an opening formed in the fiber block 12 and a button 72 mounted on one end of the rod (FIG. 4). The other end of the rod 70 is positioned to contact latch 34 of the optical connector 16 mounted on the internal side 50 of the panel 14. The release mechanism 22 also includes a spring (not shown) mounted as a sleeve on the rod 70 and located between the button 72 and opening in the fiber block so that the release mechanism is spring loaded to its closed position. The spring ensures that the button 72 returns back to its initial closed position when released and that the rod disengages from the optical connector latch 34. As shown in FIG. 9, when the button 72 is pressed the rod 70 compresses the latch 34, which releases the adapter 24 from the internally mounted optical connector 16. It is to be understood that the release mechanism 22 may be different than shown and described herein without departing from the scope of the invention.

The fiber block 12 is preferably formed from a plastic material such as LEXAN 920, available from GE Plastics. The fiber block 12 may be plated with an electroless copper-nickel plating, for example. The block 12 may also be formed from metal (e.g., sheet metal or die cast).

The fiber block 12 may be configured to support one adapter 24 or may have two or more tubular portions for supporting two or more adapters positioned generally adjacent to one another.

Figure 3:
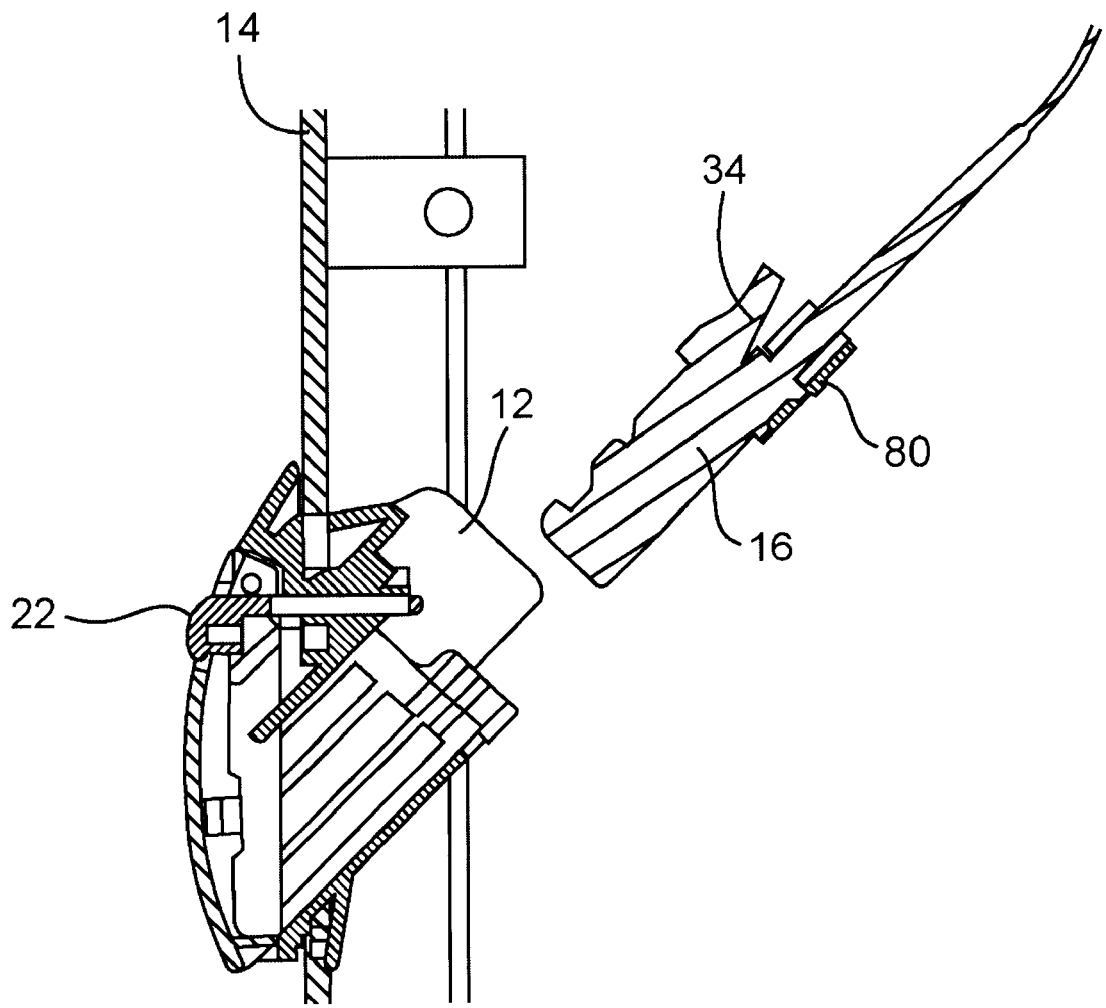
FIG. 3 is a cross-sectional view of the system of FIG. 1A prior to insertion of an internal optical connector into the release system.
Figure 5:
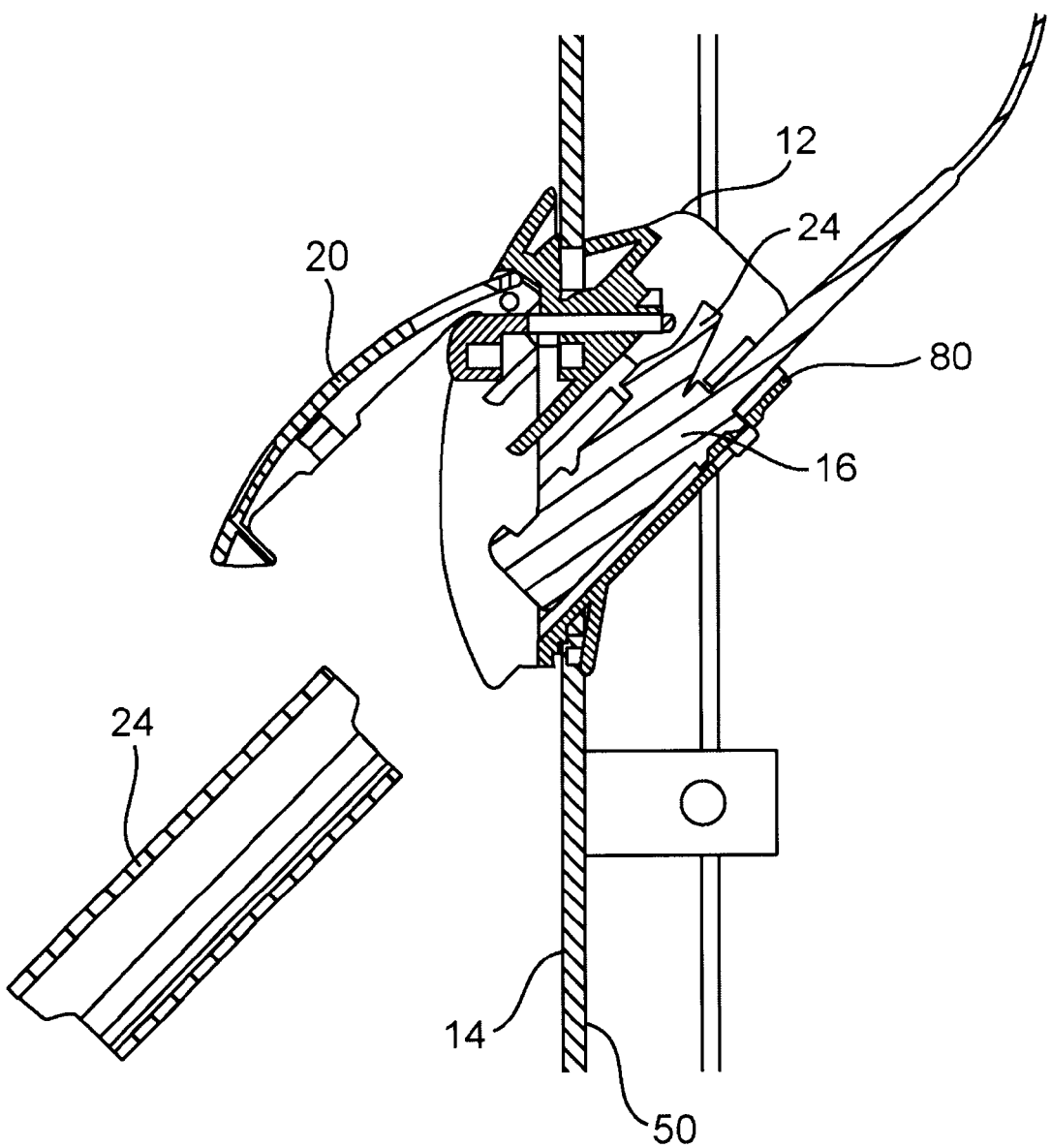
FIG. 5 is a cross-sectional view of the system of FIG. 4 with a door of the release system opened for receiving an optical connector adapter.
Figure 6:
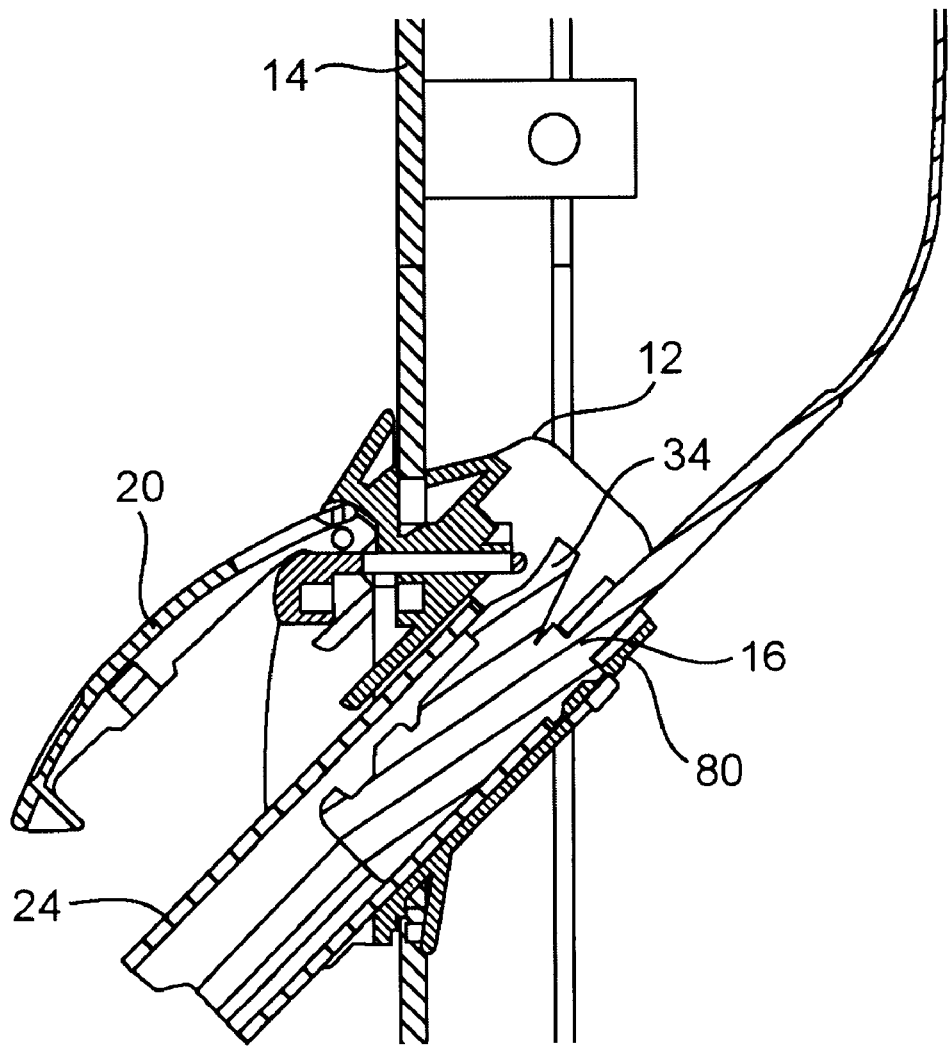
FIG. 6 is a cross-sectional view of the system of FIG. 5 with the adapter inserted into the release system and locked to internal optical connector.
Figure 7:
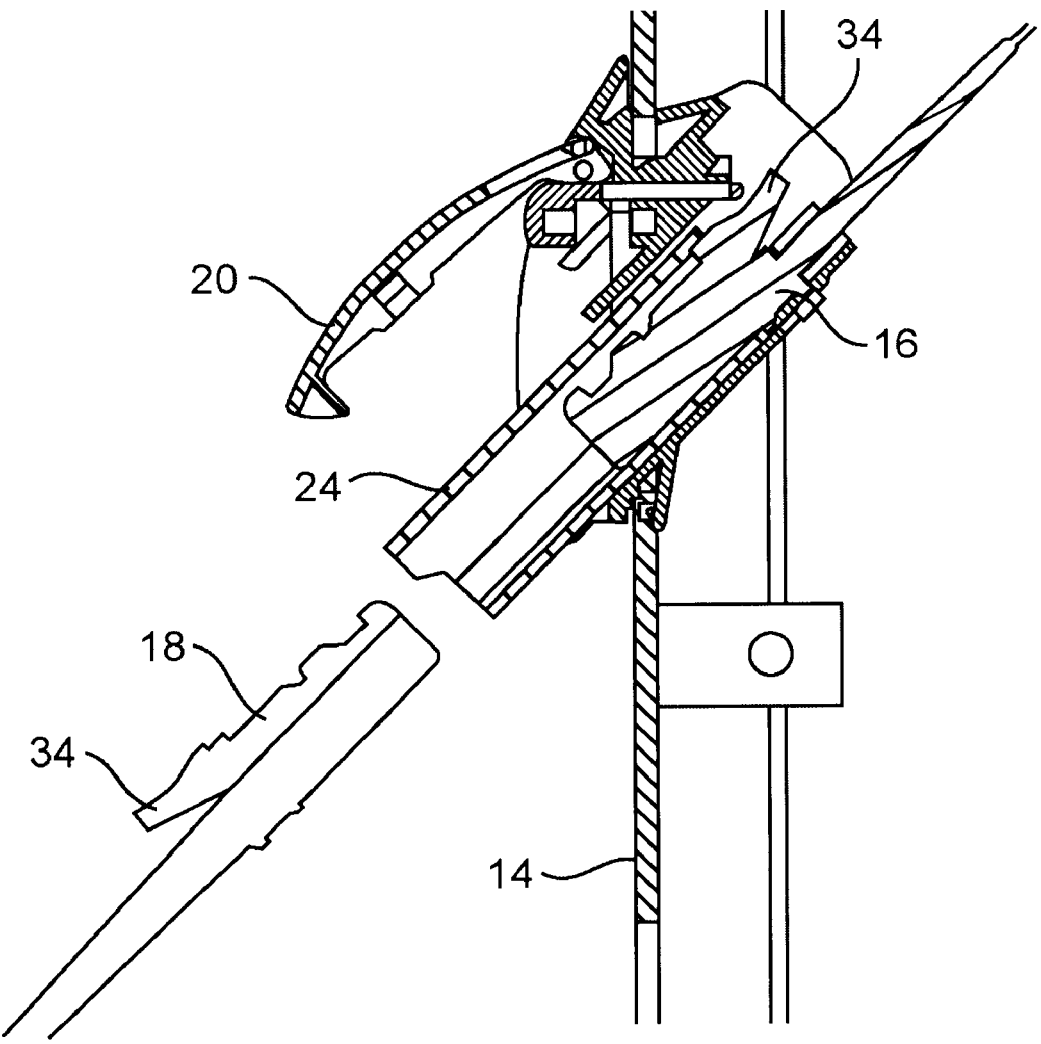
FIG. 7 is a cross-sectional view of the system of FIG. 6 prior to insertion of an external optical connector.
Figure 8:
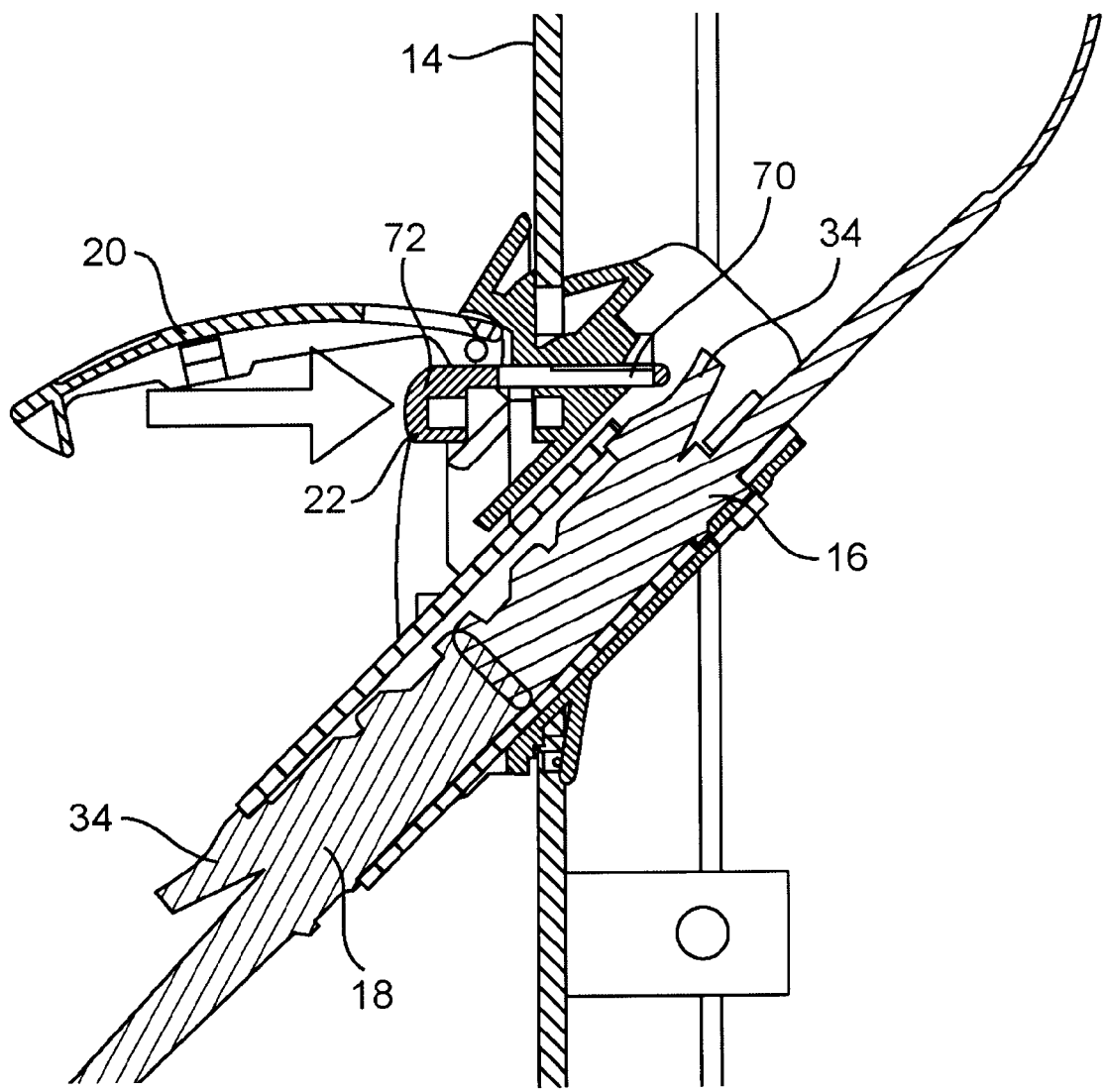
FIG. 8 is a cross-sectional view of the system of FIG. 7 with the external optical connector inserted into the release system and the door open for access to a release button.
Figure 10:
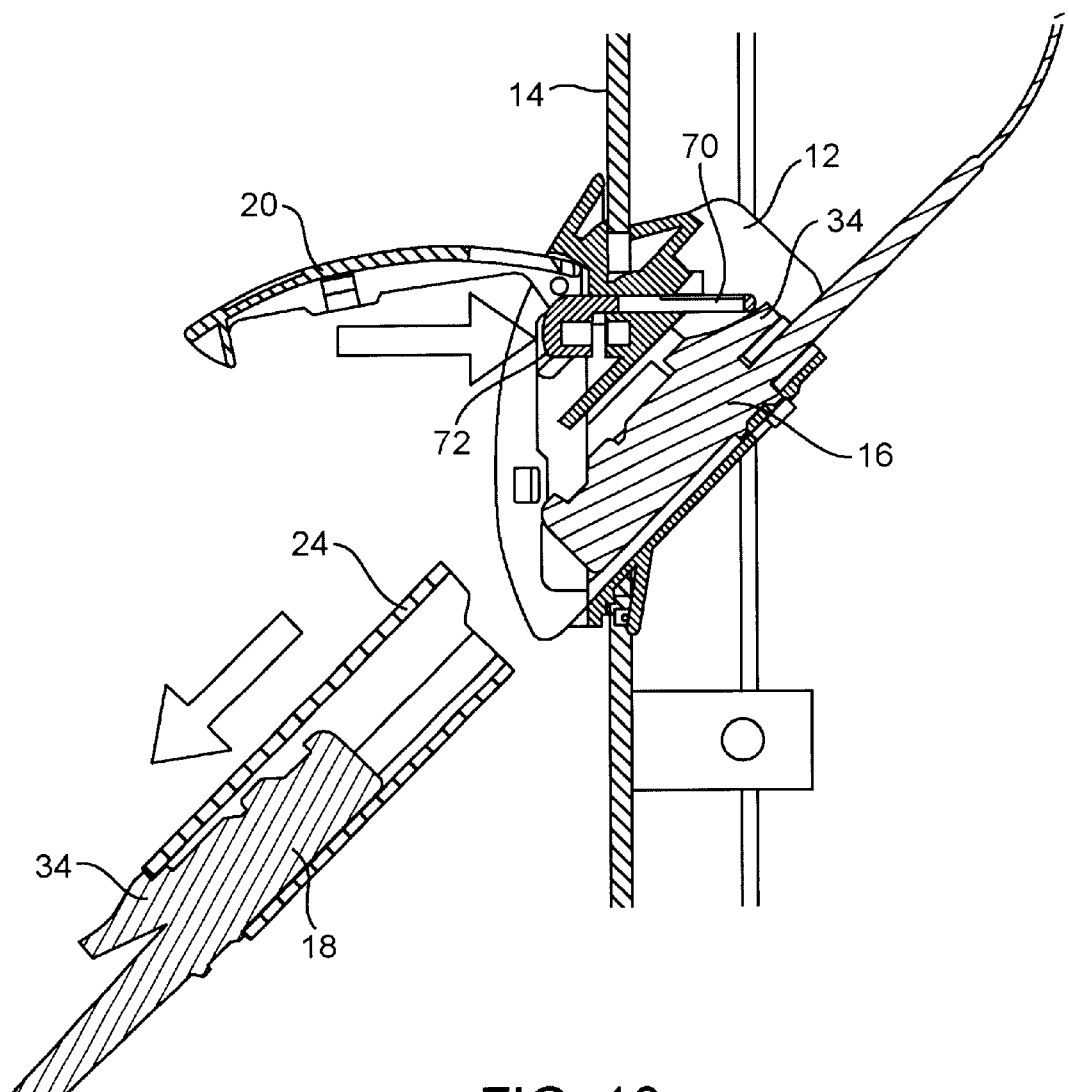
FIG. 10 is a cross-sectional view of the system of FIG. 9 with the external connector and adapter being removed from the release system while the release button is depressed.

FIGS. 3–8 illustrate assembly of the optical connectors and adapter into the fiber block 12 and FIGS. 9–10 illustrate release of the external optical connector 18 and adapter 24 from the fiber block. As shown in FIG. 3, a U-shaped interior connector adapter 80 is first attached to the interior optical connector. The interior connector adapter 80 is used to hold the connector 16 in place within the fiber block 12 prior to insertion of the adapter 24. The connector adapter 80 is provided to simplify the fiber block design and the system may be configured to operate without the connector adapter. The internal optical connector 16 and attached fiber optic line are inserted into the fiber block 12. If there is no access to the interior side of the panel 14, the interior optical connector 16 may be inserted into the fiber block 12 before the fiber block is mounted on the panel. Another option is to attach the fiber block 12 to the panel 14, insert the interior optical connector 16, and then attach the panel to the unit. FIG. 4 shows the interior optical connector 16 positioned within the fiber block 12. The door 20 of the fiber block 12 is then opened and the optical connector adapter 24 is inserted into the opening in the fiber block body and placed over the interior optical connector 16 (FIGS. 5 and 6). The adapter 24 is inserted until it contacts the latch 34 of the interior connector 16, which holds the adapter in place (FIG. 6). The external connector 18 is inserted into the open end of the adapter and held in place by latch 34 (FIGS. 7 and 8).

In order to remove the external optical connector 18 and adapter 24, the fiber block door 20 is opened and the button 72 of the release mechanism 22 is pushed (FIG. 8). As the button 72 is pushed, the spring is compressed and the rod 70 of the release mechanism contacts the latch 34 of the interior optical connector 16 (FIG. 9). When the latch 34 is depressed, the adapter 24 is free to be removed from the fiber block 12 along with the external optical connector 18 (FIG. 10). The external optical connector 18 may also be removed from the adapter 24 prior to removing the adapter from the fiber block 12 by depressing the latch 34 on the external connector.

Figure 11:
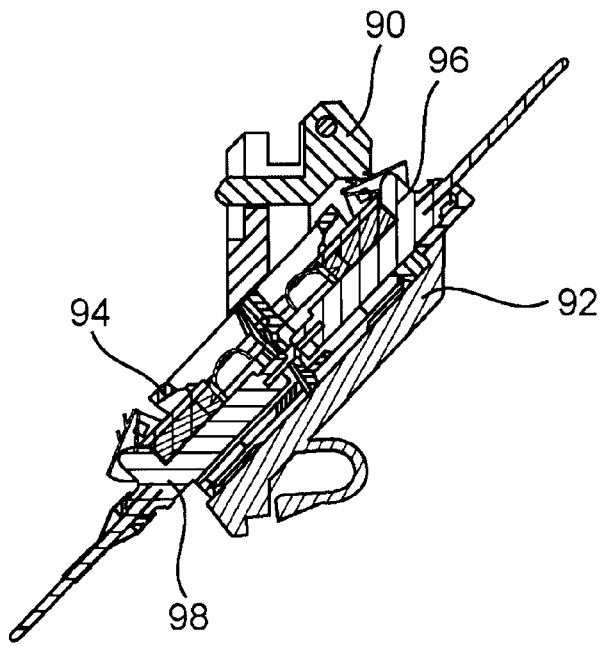
FIG. 11 is a cross-sectional view of a second embodiment of the release system of FIG. 1A.
Figure 13:
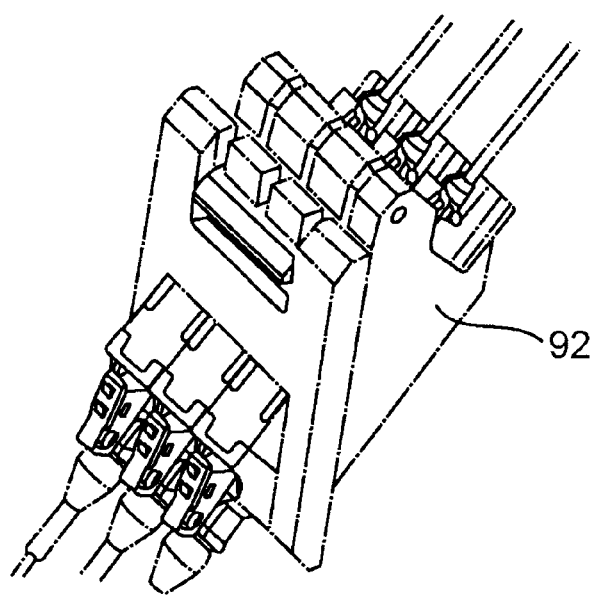
FIG. 13 is a perspective of the system of FIG. 11.
Figure 12:
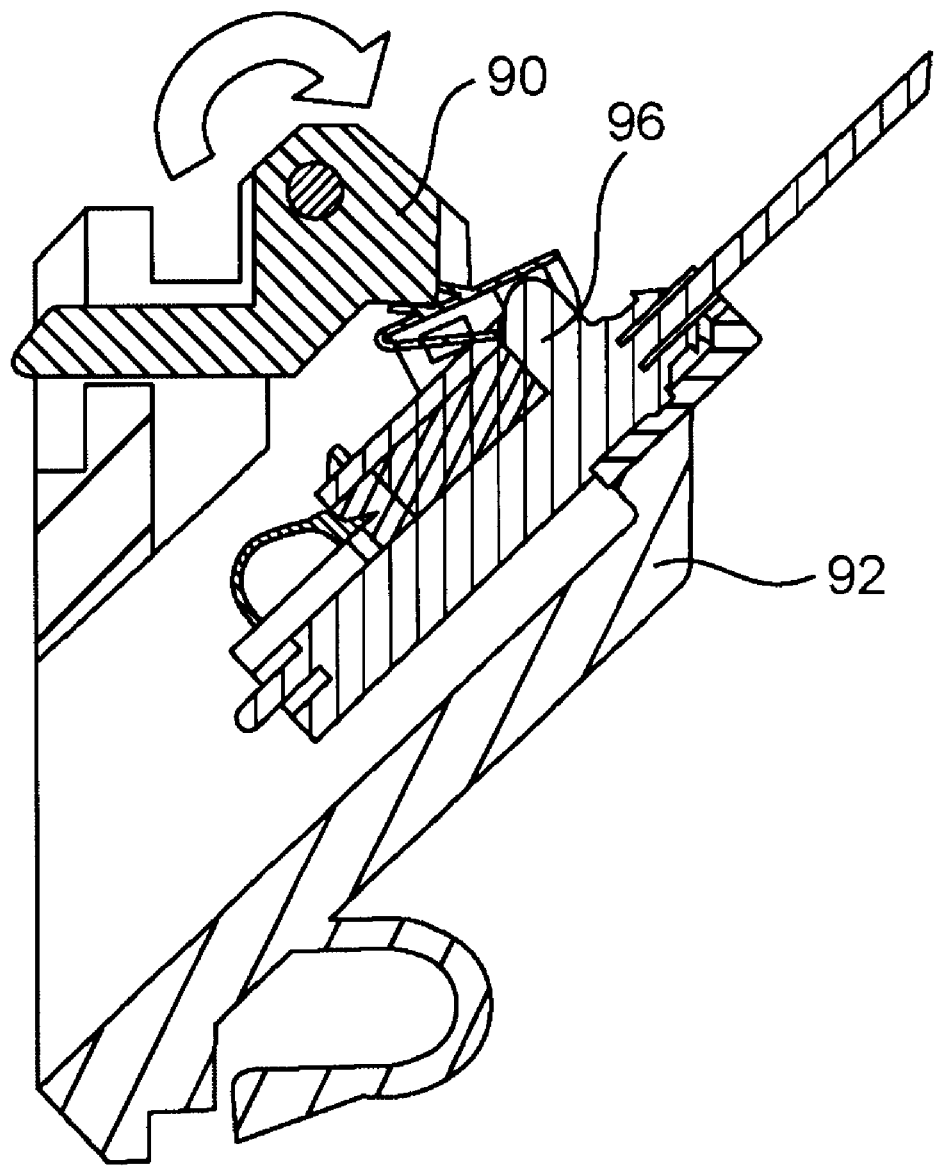
FIG. 12 is a cross-sectional view of the system of FIG. 11 with an external connector and adapter removed.

FIGS. 11–13 illustrate a second embodiment of the release system of the present invention. F3000 connectors are shown in this embodiment, however, other type of optical connectors may be used, such as LC, for example. FIG. 10 shows fiber block 92 with internal connector 96 installed and FIG. 11 shows adapter 94, internal connector 96, and external connector 98 installed. The release mechanism includes a lever 90 pivotably mounted within fiber block 92. Lever 90 releases the optical connector adapter 94. FIG. 13 is a perspective of the fiber block 92 and release mechanism showing three pairs of connectors and the release mechanism. The embodiment shown has one release mechanism configured to release all three connectors. The system may also include three independent release mechanisms.

As can be observed from the foregoing, the present invention has numerous advantages. The system provides a quick disconnect optical connector adapter which does not require access to an internal connector or tools to remove the adapter. The system provides for easy cleaning of the fiber optics and connections since the connector ferrule is more visible than with conventional systems and easily accessed.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A system for releasing an optical connector adapter from an optical connector, the adapter having a longitudinal opening extending therethrough and configured for joining two optical connectors positioned within the opening, the connectors configured for locking engagement with the adapter, the system comprising:

a block configured for connection to an equipment panel, the block comprising an opening extending therethrough and sized for receiving the optical connector adapter and an internal optical connector having an optical line extending into an interior side of the panel; and a release mechanism movably mounted within the block between a closed position in which the internal optical connector is in locking engagement with the adapter when inserted therein and an open position which allows the adapter to be released from locking engagement with the internal optical connector.

2. The system of claim 1 wherein the release mechanism is a rod slidably mounted within the block and positioned for engagement with a locking member of the optical connector when the release mechanism is in its open position.

3. The system of claim 1 wherein the release mechanism comprises a button extending from an exterior side of the panel, the button being depressible to move the release mechanism to its open position.

4. The system of claim 1 wherein the release mechanism is biased to its closed position.

5. The system of claim 1 wherein the release mechanism comprises a pivotably mounted lever having a first end positioned for engagement with a locking member of the optical connector and a second end extending from an external side of the panel.

6. The system of claim 1 further comprising a door configured to cover the opening extending through the block when the adapter is removed from the block.

7. The system of claim 1 further comprising a block adapter configured to securely hold the internal connector within the block.

8. The system of claim 1 wherein the block is configured for receiving an E2000 connector and adapter.

9. The system of claim 1 wherein the block is configured for receiving an F3000 connector and adapter.

10. The system of claim 1 wherein the block is configured for receiving a plurality of adapters and mating optical connectors with latch mechanism between adapter and connector.

11. The system of claim 1 wherein the block is plastic.

12. The system of claim 1 wherein the block is metal.

13. The system of claim 1 wherein the release mechanism is located on an external side of the equipment panel.

* * * * *